(12) United States Patent
Yang et al.

(10) Patent No.: US 9,508,042 B2
(45) Date of Patent: Nov. 29, 2016

(54) METHOD FOR PREDICTING MACHINING QUALITY OF MACHINE TOOL

(71) Applicant: NATIONAL CHENG KUNG UNIVERSITY, Tainan (TW)

(72) Inventors: Haw-Ching Yang, Tainan (TW); Hao Tieng, Tainan (TW); Min-Hsiung Hung, Taoyuan Hsien (TW); Fan-Tien Cheng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 248 days.

(21) Appl. No.: 14/069,382

(22) Filed: Nov. 1, 2013

(65) Prior Publication Data
US 2014/0129503 A1    May 8, 2014

Related U.S. Application Data

(60) Provisional application No. 61/722,250, filed on Nov. 5, 2012.

(51) Int. Cl.
*G06F 17/00* (2006.01)
*G06N 5/02* (2006.01)
*G06N 5/04* (2006.01)

(52) U.S. Cl.
CPC . *G06N 5/04* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 8,781,982 B1* | 7/2014 | Das | G06E 1/00 706/21 |
| 2003/0033041 A1* | 2/2003 | Richey | 700/98 |
| 2004/0233461 A1* | 11/2004 | Armstrong et al. | 356/620 |
| 2006/0156978 A1* | 7/2006 | Lipson | B29C 67/0055 118/708 |
| 2009/0240366 A1* | 9/2009 | Kaushal | G05B 13/0265 700/110 |
| 2009/0292386 A1* | 11/2009 | Cheng | G05B 19/41875 700/109 |
| 2011/0282480 A1* | 11/2011 | Jang et al. | 700/110 |
| 2011/0315661 A1* | 12/2011 | Morisawa et al. | 216/60 |

OTHER PUBLICATIONS

M. Chandrasekaran, M. Muralidhar, C. Murali Krishna, and U. S. Dixit, "Application of soft computing techniques in machining performance prediction and optimization: A literature review," The International Journal of Advanced Manufacturing Technology, vol. 46, No. 5-8, pp. 445-464, 2010.

(Continued)

*Primary Examiner* — Luis Sitiriche
(74) *Attorney, Agent, or Firm* — CKC & Partners Co., Ltd.

(57) ABSTRACT

A virtual metrology based method for predicting machining quality of a machine tool is provided. In this method, each product accuracy item is correlated with operation paths of the machine tool. During a modeling stage, the machine tool is operated to process workpiece samples, and sample sensing data of the workpiece samples associated with the operation paths are collected during the operation of the machine tool. The sample sensing data of each workpiece sample is de-noised and converted into the sample feature data corresponding to each feature type. The workpiece samples are measured with respect to the product accuracy item and integrated into the feature data for building a predictive model, thereby obtaining quality predicted data for each product accuracy item. During a usage stage, accuracy item values of a workpiece are predicted using the feature data during processing the workpiece in accordance with the predictive models.

11 Claims, 6 Drawing Sheets

(56) References Cited

OTHER PUBLICATIONS

K. S. Svalina and G. Šimunović, "Machined surface quality prediction models based on moving least squares and moving least absolute deviations methods," Int'l Journal of Advanced Manufacturing Technology, vol. 57, No. 9-12, pp. 1099-1106, 2011.

I. Asiltürk and Ç. Mehmet, "Modeling and prediction of surface roughness in turning operations using artificial neural network and multiple regression method," Expert Systems with Applications, vol. 38, No. 5, pp. 5826-5832, 2011.

J. V. Abellan-Nebot and F. R. Subirón, "A review of machining monitoring systems based on artificial intelligence process models," Int'l Journal of Advanced Manufacturing Technology, vol. 47, pp. 237-257, 2010.

F. J. Pontes, A. P. d. Paiva, P. P. Balestrassi, J. R. Ferreira, and M. B. d. Silva, "Optimization of radial basis function neural network employed for prediction of surface roughness in hard turning process using Taguchi's orthogonal arrays," Expert Systems with Applications, vol. 39, pp. 7776-7787, 2012.

F.T. Cheng, H.C. Huang, and C.-A. Kao, "Developing an automatic virtual metrology system," IEEE Transactions on Automation Science and Engineering, vol. 9, No. 1, pp. 181-188, 2012.

Y.T. Huang and F.T. Cheng, "Automatic data quality evaluation for the AVM system," IEEE Transactions on Semiconductor Manufacturing, vol. 24, No. 3, pp. 445-454, 2011.

\* cited by examiner

METHOD FOR PREDICTING MACHINING QUALITY OF MACHINE TOOL

RELATED APPLICATIONS

The present application is based on, and claims priority from, U.S. provisional Application Ser. No. 61/722,250, filed Nov. 5, 2012, the disclosure of which is hereby incorporated by reference herein in its entirety.

BACKGROUND

1. Field of Disclosure

The present invention relates to a method for predicting machining quality of a machine tool. More particularly, the present invention relates to a virtual metrology based method for predicting machining quality of a machine tool.

2. Description of Related Art

In the machine tool industry, machined accuracy of a workplace by a machine tool is useful for identifying whether the workplace meets design tolerances, thereby recognizing machining quality of the machine tool, so as to align, calibrate, and certify the machine tool or to stop machining operations accordingly to prevent subsequent workpieces from being out of tolerance.

Conventionally, machined accuracy of the workplace can be measured by two approaches: air off-machine measurement and an on-machine measurement. The off-machine measurement approach only samples machined workpieces for measuring their machined accuracy with dedicated measuring machines, such as a coordinate measuring machine (CMM). Compared to the on-machine measurement approach, the off-machine measurement approach may provide better accuracy of the workpiece measurement, and requires fewer time and cost for the workpiece measurement because only few sampled workpieces are measured. However, the sampling interval between two workpiece measurements is usually more than several hours. Thus, adopting off-machine workpiece measurement may suffer from the risk of producing considerable defective or out-of-tolerance workpieces if the performance of the machine tool deviates from a normal state within the sampling interval.

The on-machine measurement approach measures every machined workpiece with probes fixed on the machine tool by using a measurement method such as a probe, laser or image processing technique. Compared to the off-machine measurement approach, the on-machine measurement approach may provide relatively prompt measurement results. Nevertheless, the on-machine measurement requires sacrificing the available machining time of a machine tool for performing measurements, thus reducing the availability of the machine tool. Besides, to equip all of the factory-wide machine tools with measuring devices will bring significant cost to the on-machine measurement approach.

SUMMARY

An object of the present invention is to provide a method for predicting machining quality of a machine tool, thereby simultaneously meeting the requirements of promptness and accuracy for conjecturing an accuracy value of every machined workpiece, and overcoming the disadvantages of the conventional off-machine and on-machine measurement approaches, thus predicting machining quality of a machine tool.

According to an aspect of the present invention, a virtual metrology based method for predicting machining quality of a machine tool is provided. In the method, each of at least one product accuracy item (such as surface roughness, straightness, angularity, perpendicularity parallelism and/or roundness) is correlated with operation paths of the machine tool, thereby obtaining relationships between the at least one product accuracy item and the operation paths. Then, the machine tool is operated to process workpiece samples according the operation paths, and sets of sample sensing data of the workpiece samples associated with the operation paths are collected during the operation of the machine tool, in which the sets of sample sensing data (such as vibration and/or acoustic data) are obtained from at least one sensor (such as accelerometers and/or acoustic emission (AE) sensors) installed on the machining tool. Thereafter, each workpiece sample is measured with respect to the at least one product accuracy item, thereby obtaining at least one set of quality sample data of the workpiece samples for the least one product accuracy item. Then, the set of sample sensing data of each workpiece sample is de-noised (filtered) by using an algorithm such as a wavelet de-noising method, and converted into at least one set of sample feature data corresponding to at least one feature type (such as time, frequency and/or time-frequency domain). A predictive model is established using the at least one set of sample feature data of each workpiece sample and the at least one set of quality sample data of the workpiece samples in accordance with a predictive algorithm and the relationships between the at least one product accuracy item and the operation paths. After the predictive algorithm is built, the machine tool is operated to process a workpiece according the operation paths, and a set of sensing data of the workpiece associated with the operation paths is obtained during the operation of the machine tool, wherein the set of sensing data is obtained from the aforementioned sensors installed on the machining tool. Then, the set of sensing data of the workpiece is de-noised (filtered) by using an algorithm such as a wavelet de-noising method, and converted into at least one set of feature data corresponding to the aforementioned feature types. Thereafter, the at least one set of feature data of the workpiece is inputted into the predictive model to conjecture at least one predicted accuracy value of the workpiece with respect to the at least one product accuracy item.

In one embodiment, in the aforementioned method, the workpiece is actually measured by a measuring machine such as a coordinate measuring machine (CMM), with respect to the at least one product accuracy item, thereby obtaining at least one actual accuracy value (product accuracy item value) of the workpiece, and then the predictive model is updated using the at least one set of feature data of the workpiece and the at least one actual accuracy value of the workpiece.

In one embodiment, in the aforementioned method, a product contour containing the dimensions and tolerances of a product is designed using a computer aided design (CAD) tool, and the aforementioned operation paths of the machine tool are generated using a computer aided manufacturing (CAM) tool according to the dimensions and tolerances of the product and characteristics of the machine tool.

In one embodiment, in the aforementioned method, at least one set of key feature data is selected from the at least one set of sample feature data of each workpiece sample and the at least one set of feature data of the workpiece by using an intelligent feature selection method (such as a non-dominated sorting genetic algorithm (NSGA)), and then the predictive model is updated using the at least one set of key feature data, the at least one set of quality sample data of the workpiece samples, and the at least one actual accuracy value of the workpiece.

In one embodiment, the operations of filtering and converting the set of sample sensing data of each workpiece sample and filtering and converting the set of sensing data of the workpiece are performed using fast Fourier transform (FFT) or discrete wavelet transform (DWT).

In one embodiment, the predictive algorithm includes a neural network (NN) algorithm, a multi-regression (MR) algorithm, a partial least square (PLS) algorithm or a support vector machines (SVM) algorithm.

Hence, with the application of the embodiments of the present invention, the accuracy value of every workpiece machined by the machine tool can be effectively conjectured promptly, such that the machining quality of the machine tool can be recognized timely.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION

The spirit of the present invention will be described clearly through the drawings and the detailed description as follows. Any of those of ordinary skills in the art can make modifications and variations from the technology taught in the present invention after understanding the embodiments of the present invention, without departing from the sprite and scope of the present invention.

Virtual metrology (VM) has become an effective way to conduct workpiece measurements in high-tech industries, such as the TFT-LCD industry, the semiconductor industry, and the solar-cell industry, where wafer and glass are workpieces in semiconductor manufacturing and TFT-LCD manufacturing, respectively. The essential preparatory work of performing VM on a manufacturing process is to build a predictive model, namely a VM model, which can closely model the input-output relationship of that process. The VM model can be created by training some algorithmic methods, such as back-propagation neural network and multiple regression techniques, with historical process parameter data as inputs and the corresponding manufacturing quality data of workpieces as outputs. Once inputted with the process parameter data of manufacturing a workpiece, the VM model instantly conjectures the manufacturing quality of that workpiece so that equipment or process abnormalities might be timely detected. The aforementioned VM model can be referred to U.S. Pat. No. 7,603,328 entitled "Dual-phase virtual metrology method", which is incorporated herein by reference.

Unlike the generally stable processes in high-tech industries, the machining processes of a machine tool possess the characteristics of severe vibrations and loud noises because strong impact and friction would occur among the tool, a workpiece, and removed chip during the material removing process. This will cause the signals obtained from vibration sensors attached to the machine tool to have low signal/noise (S/N) ratios, thereby affecting the predicted accuracy of VM. Thus, how to effectively handle signals with low S/N ratios and extract key features from them is a challenging issue for successfully applying VM to the machine tools.

Figure 1:
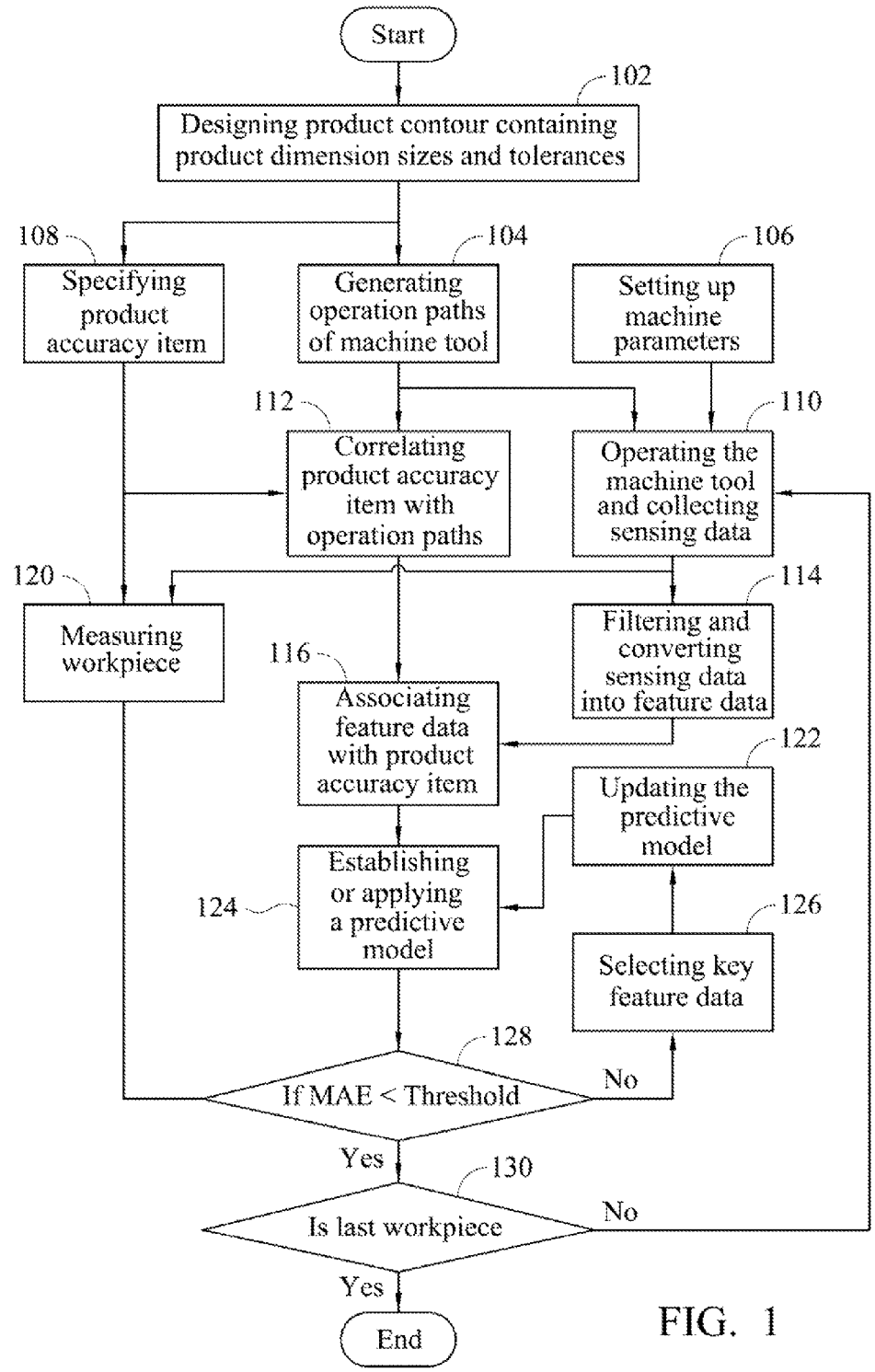
FIG. 1 is a schematic flow chart showing a virtual metrology based method for predicting machining quality of a machine tool according to one embodiment of the present invention.

Referring to FIG. 1, FIG. 1 is a schematic flow chart showing a virtual metrology based method for predicting machining quality of a machine tool according to one embodiment of the present invention.

Figure 2A:
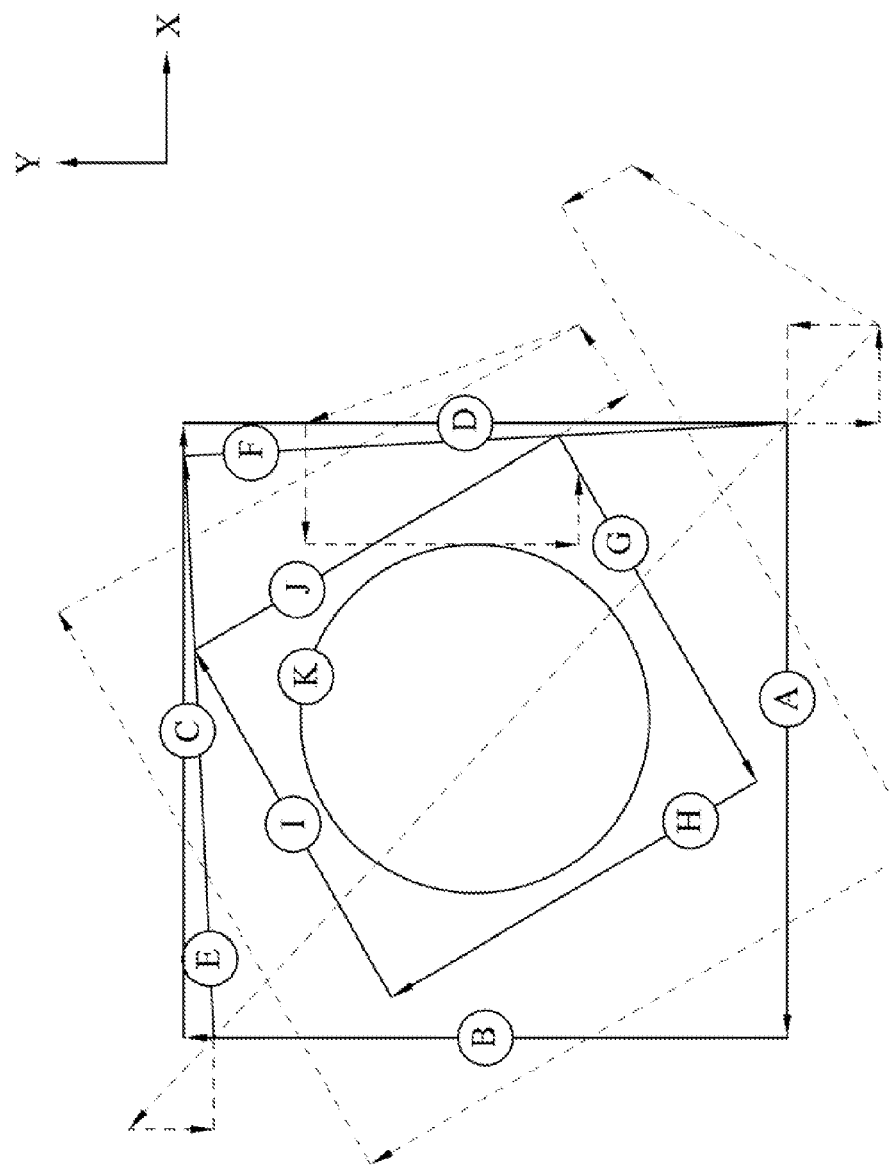
FIG. 2A illustrates exemplary operation paths of the machine tool according to one embodiment of the present invention.
Figure 2B:
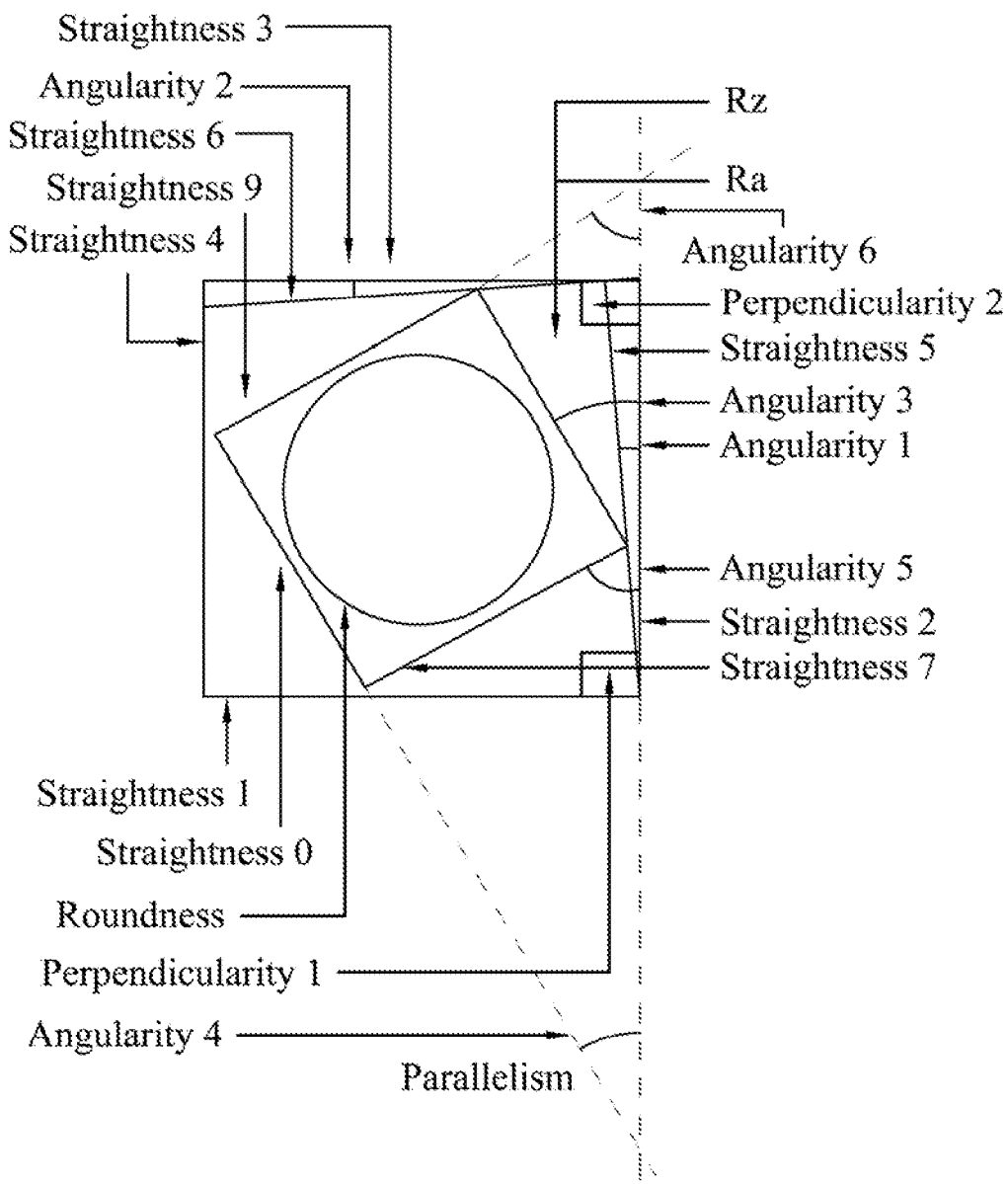
FIG. 2B illustrates exemplary product accuracy items of a workpiece according to one embodiment of the present invention.

At first, the method begins with a modeling stage. At operation 102, a product contour containing the dimensions and tolerances of a product is first designed. For example, a computer aided design (CAD) tool may be used to design the product contour and exports a CAD file containing the product dimensions and tolerances. At operation 104, operation paths of the machine tool are generated according to the dimensions and tolerances of the product and characteristics of the machine tool. For example, according to the CAD file and characteristics of the machine tool (such as machine tool's configuration and controller's properties), a machine tool operation path file containing the operation paths may be generated by using a computer aided manufacturing (CAM) tool, thereby generating a NC (Numerical Control) code file. After operation 102, at least one product accuracy item is specified for determining if a workpiece machined by the machine tool is within acceptance tolerances (operation 108). The at least one product accuracy item includes surface roughness and/or dimensional deviations including straightness, angularity, perpendicularity parallelism and/or roundness, etc. Referring to FIG. 2A and FIG. 2B, FIG. 2A and FIG. 2B illustrate exemplary operation paths of the machine tool and exemplary product accuracy items of a workpiece according to one embodiment of the present invention. As shown in FIG. 2A, each standard workpiece is machined by 11 machining operations (operation paths) identified by A, B, . . . , K, and its product accuracy items to be measured include surface roughness Rz/Ra, straightness, angularity, roundness, perpendicularity and parallelism at respective positions, as shown in FIG. 2B.

At operation 112, each of at least one product accuracy item is correlated with operation paths of the machine tool, thereby obtaining relationships between the at least one product accuracy item and the operation paths. As shown in FIG. 2A and FIG. 2B, Operation C may determine Straightness 3; Operation D may determine Straightness 2; and Operations H and J may determine Parallelism. In one embodiment, the desired product accuracy items (surface roughness and/or dimensional deviations) are correlated and tagged with the machining operations in the NC code file. Restated, each of the desired product accuracy items is related to the macro codes of the machining operation in the tagged NC code file. Each machining operation can be related to multiple sets of macro codes. For example, the operation of machining a straight segment corresponds to several sets of macro codes, and each set of macro codes consists of multiple G codes. Notably, a dimensional deviation can correspond to multiple machining operations. For instance, the parallelism (a product accuracy item) corresponds to two machining operations.

Figure 3A:
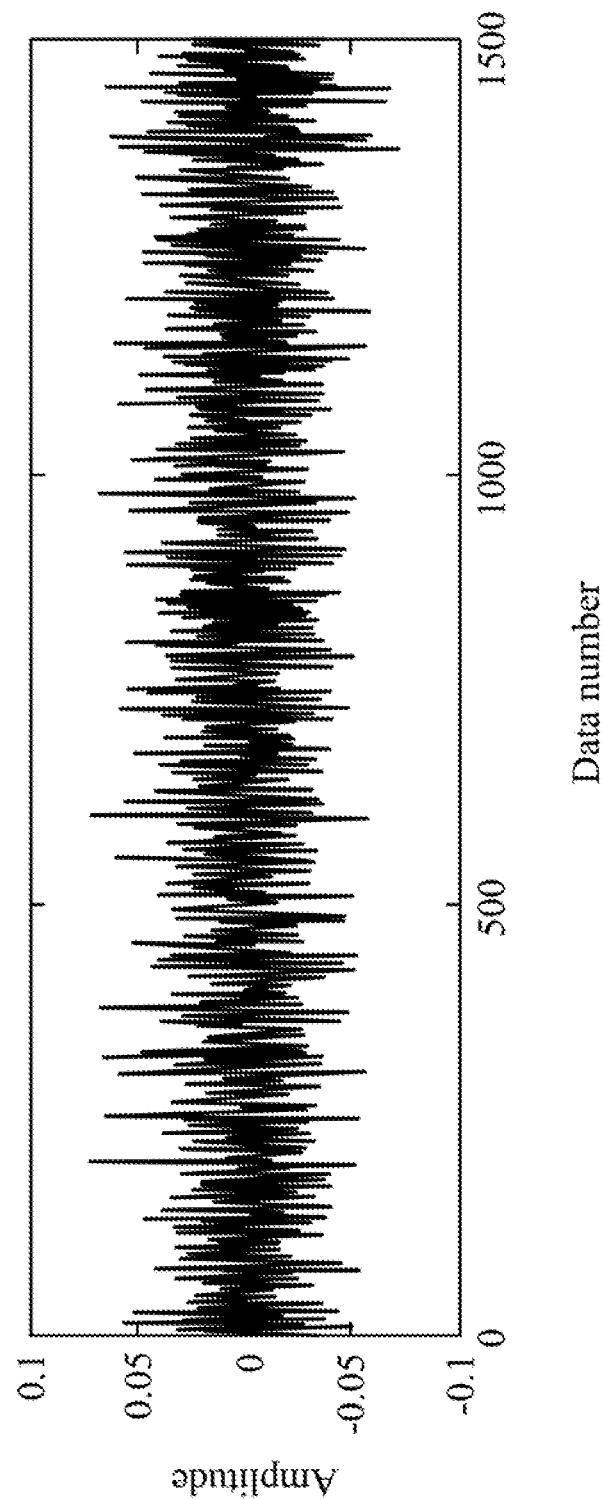
FIG. 3A illustrates an exemplary set of raw sensing data of a workpiece collected during the operation of the machine tool according to one embodiment of the present invention.

Before conducting the machining operation of the machine tool, machining parameters need to be configured and set up at operation 106, including feeding rate, machining depth, maximal spindle speed. Following configuration of the machining parameters, at operation 110, the machine tool is operated to process workpiece samples according the operation paths, and sets of sample sensing data of the workpiece samples associated with the operation paths are collected during the operation of the machine tool. The operation of the machine tool often causes noises and vibrations, and thus sensors (such as accelerometers and/or acoustic emission (AE) sensors, etc.) are installed on the machining tool to collect the sets of raw sample sensing data (such as vibration and/or acoustic data, etc.) as shown in FIG. 3A.

Figure 3B:
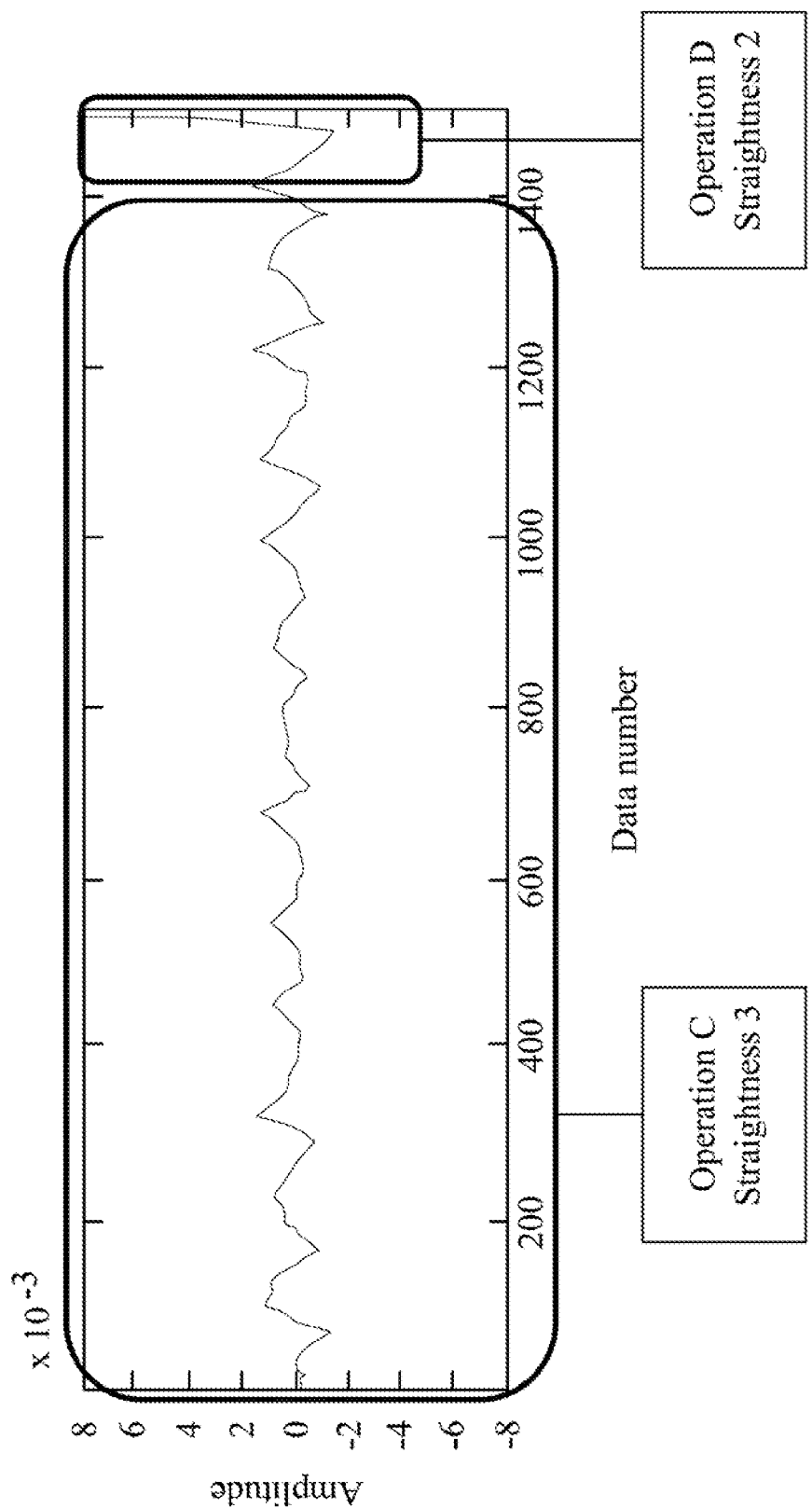
FIG. 3B illustrates an exemplary set of de-noised sensing data of the workpiece associated with the operation paths according to one embodiment of the present invention.
Figure 3C:
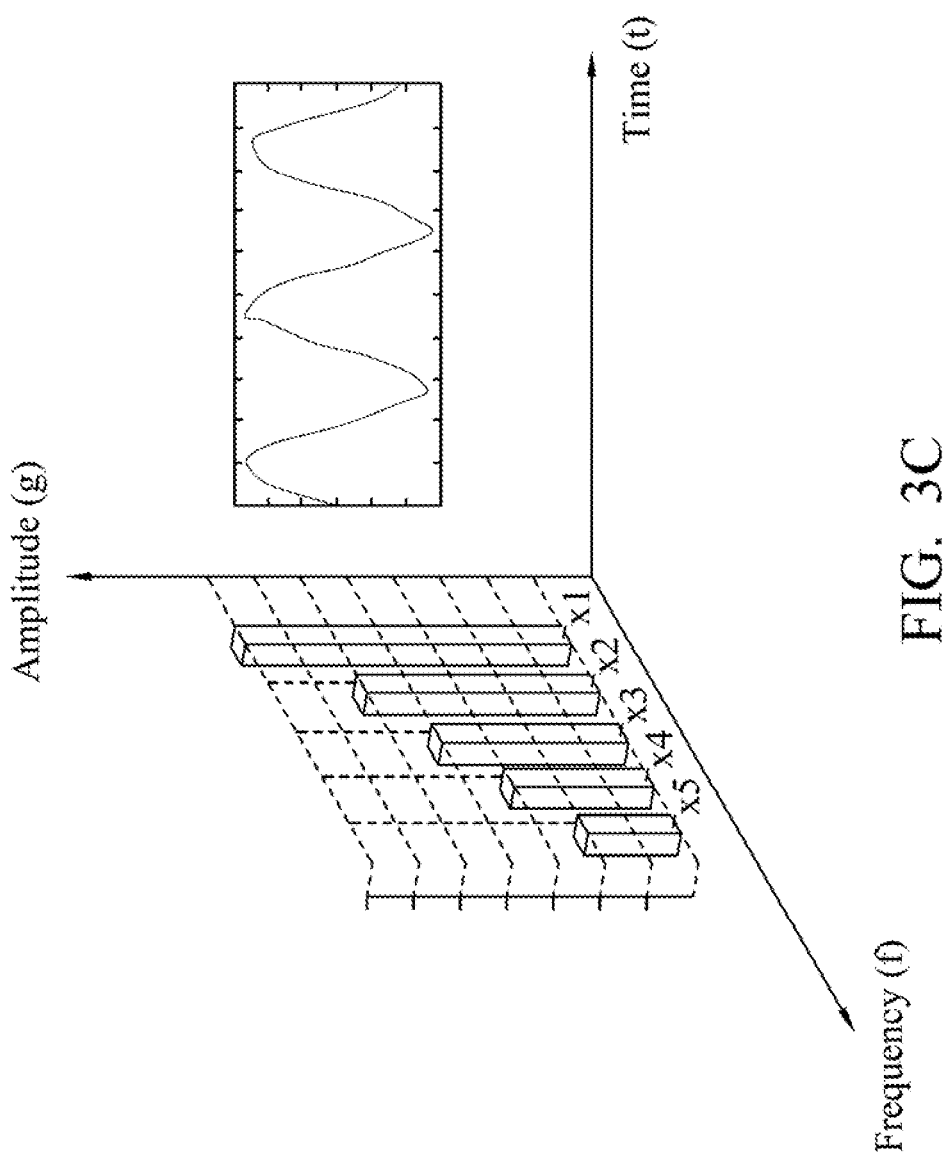
FIG. 3C illustrates exemplary sets of sample feature data corresponding to time, frequency and time-frequency domains according to one embodiment of the present invention.

After the machining operations of the workpiece samples are completed, at operation 114, the set of sample sensing data of each workpiece sample is de-noised (filtered) by using an algorithm such as a wavelet de-noising method, and converted into at least one set of sample feature data corresponding to at least one feature type such as time, frequency and/or time-frequency domain. The sets of sample sensing data acquired during the machining operations are processed by different algorithmic methods, such as time, frequency and time-frequency domain methods, to de-noise and extract various sets of sample feature data related to the machining operations. Referring to FIG. 3B and FIG. 3C, FIG. 3B illustrates an exemplary set of de-noised sensing data of the workpiece associated with the operation paths, and FIG. 3C illustrates exemplary sets of sample feature data corresponding to time, frequency and time-frequency domains. In some embodiments, the frequency-domain methods and time-frequency domain methods may be fast Fourier transform (FFT) or discrete wavelet transform (DWT) etc. which can be used to transform time-domain data into the frequency-domain for deriving power spectral density features of different frequency bandwidths or to transform time-domain data into the time-frequency domain for deriving wavelet energy features of different wavelet nodes. For example, categories of (sample) feature data in time domain are [peak to peak], [standard deviation], [mean], [minimum], [maximum], [skewness], [kurtosis], [root mean square], [crest factor]; categories of (sample) feature data in frequency domain are [power spectral density 1(frequency×¼)], [power spectral density 2(frequency×½)], [power spectral density 3(frequency×1)], [power spectral density 4(frequency×2)], [power spectral density 5(frequency×3)]; categories of (sample) feature data in time-frequency Domain are [wavelet package node energy1], [wavelet package node energy2], [wavelet package node energy3], [wavelet package node energy4], [wavelet package node energy5], [wavelet package node energy6]. The utilization of the aforementioned FFT and DWT are well known to those who are skilled in the art, and are not described in detail herein.

After the machining operations of the workpiece samples are completed, at operation 120, each workpiece sample is measured with respect to the at least one product accuracy item by a measuring machine, such as a coordinate measuring machine (CMM), thereby obtaining at least one set of quality sample data (actual accuracy values) of the workpiece samples for the least one product accuracy item. At operation 116, the at least one set of sample feature data are associated with the product accuracy item.

Thereafter, at operation 124, a predictive model with respect to the at least one product accuracy item is established using the at least one set of sample feature data of each workpiece sample and the at least one set of quality sample data of the workpiece samples in accordance with a predictive algorithm and the relationships between the at least one product accuracy item and the operation paths. The predictive algorithm includes a neural network (NN) algorithm, a multi-regression (MR) algorithm, a partial least square (PLS) algorithm or a support vector machines (SVM) algorithm, etc. The utilization of the aforementioned NN, MR, PLS and SVM are well known to those who are skilled in the art, and are not described in detail herein.

After a predictive model is established, the method enters a usage stage, i.e. operation 110 is returned to operate the machine tool to process a workpiece according the operation paths, and collect a set of sensing data of the workpiece associated with the operation paths during the operation of the machine tool, wherein the set of sensing data is obtained from the aforementioned sensors installed on the machining tool. Then, at operation 114, the set of sensing data of the workpiece is de-noised (filtered) by using an algorithm such as a wavelet de-noising method, and converted into at least one set of feature data corresponding to the aforementioned feature types. Thereafter, et operation 124, the at least one set of feature data of the workpiece is inputted into a predictive model to conjecture at least one predicted accuracy value of the workpiece with respect to the at least one product accuracy item.

If the workpiece is measured at operation 120 with respect to the at least one product accuracy item, at least one actual accuracy value of the workpiece is obtained. Then, operation 128 is performed to check if the mean absolute error (MAE) between the at least one actual accuracy value of the workpiece and the corresponding predicted accuracy value of the workpiece is smaller than a threshold. When the result is no, meaning that the predicted accuracy of the predictive model with respect to the accuracy item(s) is not good enough, operation 122 is performed to update the predictive model using the at least one set of feature data of the workpiece and the at least one actual accuracy value of the workpiece. The predictive model can be updated by tuning or retraining. In the tuning process, only the at least one set of feature data of the workpiece and the at least one actual accuracy value of the workpiece are used to tune the predictive model. In the retraining process, the at least one set of feature data of the workpiece and the at least one actual accuracy value of the workpiece are added to the at least one set of sample feature data of each workpiece sample and the at least one set of quality sample data of the workpiece samples to retrain the predictive model with respect to the at least one product accuracy item.

In some embodiments, at operation 126, a feature selection method is used to select at least one set of key feature data from the at least one set of sample feature data of each workpiece sample and the at least one set of feature data of the workpiece. The feature selection method may include a stepwise selection (SS) approach or a non-dominated sorting genetic algorithm (NSGA), etc. Too many sets of sample feature data and feature data not only consume a lot of computing resource but also affect the predicted accuracy. Therefore, selecting key feature data is important for successfully applying VM to the machine tools. The utilization of the aforementioned SS and NSGA are well known to those who are skilled in the art, and are not described in detail herein.

When the result of operation 128 is yes, meaning that the predicted accuracy of a predictive model is good enough, operation 130 is performed to check the workpiece is the last one needing machined. If all of the workpieces of the product are machined, then the workflow is ended; otherwise, operation 110 is returned in order to machine the remaining workpieces. In some embodiments, if the workpiece is not measured at operation 120, operation 130 is directly performed without performing operation 128.

It can be known from the above embodiments of the present invention that, the accuracy value of every workpiece machined by the machine tool can be effectively conjectured promptly, such that the machining quality of the machine tool can be recognized timely.

Although the present invention has been described with reference to the preferred embodiments thereof, it is apparent to those skilled in the art that a variety of modifications and changes may be made without departing from the scope of he present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly state otherwise. Thus, unless expressly stated otherwise, each feature disclosed is one example only of a generic series of equivalent or similar features.

What is claimed is:

1. A method for predicting machining quality of a machine tool, the method comprising:
   correlating each of at least one product accuracy item with a plurality of operation paths of the machine tool, thereby obtaining a plurality of relationships between the at least one product accuracy item and the operation paths, wherein the at least one product accuracy item comprises measurement items related to a dimensional or geometric deviation, and the operation paths of the machine tool determines the at least one product accuracy item respectively;
   operating the machine tool to machine a plurality of workpiece samples along each of the operation paths, and collecting a plurality of sets of sample sensing data of the machine tool while the machine tool is machining the workpiece samples along each of the operation paths, wherein the sets of sample sensing data belong to each of the operation paths and are corresponding to the workpiece samples respectively, and are obtained from at least one sensor installed on the machining tool, the sets of sample sensing data comprising vibration data generated by the machine tool in operation;
   measuring the at least one product accuracy item of each workpiece sample, thereby obtaining at least one set of quality sample data of the workpiece samples for the at least one product accuracy item, wherein the at least one product accuracy item is determined by each of the operation paths in accordance with the relationships;
   filtering and converting the set of sample sensing data corresponding to each workpiece sample into at least one set of sample feature data corresponding to at least one feature type comprising a time domain, a frequency domain and/or a time-frequency domain;
   establishing a predictive model corresponding to each of the operation paths with respect to the at least one product accuracy item using the at least one set of sample feature data corresponding to each workpiece sample and the at least one set of quality sample data of the workpiece samples in accordance with a predictive algorithm;
   operating the machine tool to machine a workpiece according to each of the operation paths, and collecting a set of sensing data of the machine tool that is machining the workpiece along each of the operation paths, wherein the set of sensing data is obtained from the at least one sensor installed on the machining tool, the set of sensing data comprising vibration generated by the machine tool in operation;
   filtering and converting the set of sample sensing data corresponding to the workpiece into at least one set of feature data corresponding to at least one feature type; and
   inputting the at least one set of feature data corresponding to the workpiece into the predictive model to conjecture at least one predicted accuracy value of the workpiece with respect to the at least one product accuracy item, thereby predicting the machining quality of the machine tool.

2. The method of claim 1, further comprising:
   actually measuring the at least one product accuracy item of the workpiece, thereby obtaining at least one actual accuracy value of the workpiece; and
   updating the predictive model using the at least one set of feature data corresponding to the workpiece and the at least one actual accuracy value of the workpiece.

3. The method of claim 1, further comprising:
   actually measuring the at least one product accuracy item of the workpiece, thereby obtaining at least one actual accuracy value of the workpiece;
   selecting at least one set of key feature data from the at least one set of sample feature data of each workpiece sample and the at least one set of feature data of the workpiece by using an intelligent feature selection method; and
   updating the predictive model using the at least one set of key feature data, the at least one set of quality sample data of the workpiece samples, and the at least one actual accuracy value of the workpiece.

4. The method of claim 3, wherein the intelligent feature selection method comprises a non-dominated sorting genetic algorithm (NSGA) or a stepwise selection (SS) approach.

5. The method of claim 1, further comprising:
   designing a product contour containing a plurality of dimensional and geometric tolerances of a product; and
   generating the operation paths of the machine tool according to the dimensional and geometric tolerances of the product and a plurality of characteristics of the machine tool.

6. The method of claim 5, wherein the operation of designing the product contour is performed using a computer aided design (CAD) tool.

7. The method of claim 5, wherein the operation of generating the operation paths of the machine tool is performed using a computer aided manufacturing (CAM) tool.

8. The method of claim 1, wherein the operations of filtering and converting the set of sample sensing data of each workpiece sample and filtering and converting the set of sensing data of the workpiece are performed using a wavelet de-noising method and fast Fourier transform (FFT) or discrete wavelet transform (DWT).

9. The method of claim 1, wherein the predictive algorithm comprises a neural network (NN) algorithm, a multi-regression (MR) algorithm, a partial least square (PLS) algorithm or a support vector machines (SVM) algorithm.

10. The method of claim 1, wherein the at least one product accuracy item comprises surface roughness, straightness, angularity, perpendicularity, parallelism and/or roundness.

11. The method of claim 1, wherein the sets of sample sensing data and the set of sensing data comprise acoustic data generated by the machine tool in operation.

* * * * *